United States Patent
Hiraoka

(10) Patent No.: US 9,226,487 B2
(45) Date of Patent: Jan. 5, 2016

(54) FISHING REEL GEAR ATTACHMENT STRUCTURE

(75) Inventor: Hirokazu Hiraoka, Osaka (JP)

(73) Assignee: Shimano, Inc., Osaka (JP)

(*) Notice: Subject to any disclaimer, the term of this patent is extended or adjusted under 35 U.S.C. 154(b) by 94 days.

(21) Appl. No.: 13/292,456

(22) Filed: Nov. 9, 2011

(65) Prior Publication Data

US 2012/0128414 A1    May 24, 2012

(30) Foreign Application Priority Data

Nov. 18, 2010 (JP) .................. 2010-257909

(51) Int. Cl.
*F16B 3/00* (2006.01)
*A01K 89/01* (2006.01)
*A01K 89/015* (2006.01)

(52) U.S. Cl.
CPC ........... *A01K 89/0114* (2013.01); *A01K 89/015* (2013.01); *Y10T 403/7016* (2015.01)

(58) Field of Classification Search
CPC . A01K 89/01; A01K 89/0114; A01K 89/015; F16D 1/10; F16D 1/101; F16D 1/104; F16D 1/108; F16D 1/112; F16D 1/0894; F16H 57/0025
USPC ............ 403/1, 230, 245, 246, 263, 348, 349, 403/360, 361, 364, 375, 381, 383; 242/278, 242/279, 280, 281
See application file for complete search history.

(56) References Cited

U.S. PATENT DOCUMENTS

| | | | | |
|---|---|---|---|---|
| 1,402,811 A | * | 1/1922 | Upton | 242/281 |
| 1,941,227 A | * | 12/1933 | Russell et al. | 242/279 |
| 2,149,413 A | * | 3/1939 | Bals et al. | 242/279 |
| 2,639,870 A | * | 5/1953 | Graham | 242/280 |
| 2,834,620 A | * | 5/1958 | Maude | 403/254 |
| 3,327,994 A | * | 6/1967 | Carl | 403/383 |
| 3,916,715 A | * | 11/1975 | Covey | 74/414 |

(Continued)

FOREIGN PATENT DOCUMENTS

| | | | |
|---|---|---|---|
| GB | 2309502 A | * | 7/1997 |
| JP | 61-20166 U | | 2/1986 |

(Continued)

OTHER PUBLICATIONS

Extended European Search Report of the corresponding European Application No. 11182354.8, dated Mar. 23, 2012.

*Primary Examiner* — Daniel P Stodola
*Assistant Examiner* — Matthieu Setliff
(74) *Attorney, Agent, or Firm* — Global IP Counselors

(57) ABSTRACT

A gear attachment structure receives rotation of a handle assembly. The gear attachment structure includes a traverse cam shaft and a driven gear. The traverse cam shaft includes a shaft body, a gear support portion and a gear engaging portion. The gear support portion includes intersecting helical grooves on the outer peripheral surface. The gear support portion is disposed on an end of the shaft body and has a circular cross-section. The gear engaging portion includes a pair of circular-arc portions and a pair of straight portions. The circular-arc portions are opposed to each other while being either disposed along and within the outer periphery of the gear support portion or disposed radial outwards of the gear support portion. One of the straight portions is coupled to one ends of the circular-arc portions whereas the other of the straight portions is coupled to the other ends of the circular-arc portions.

10 Claims, 10 Drawing Sheets

(56) References Cited

U.S. PATENT DOCUMENTS

| | | | | |
|---|---|---|---|---|
| 4,179,084 A | * | 12/1979 | Noda | 242/261 |
| 4,666,101 A | * | 5/1987 | Atobe | 242/280 |
| 4,899,952 A | * | 2/1990 | Aoki | 242/260 |
| 4,927,095 A | * | 5/1990 | Young | 242/261 |
| 5,123,609 A | * | 6/1992 | Noda | 242/261 |
| 5,249,760 A | | 10/1993 | Morimoto | |
| 5,308,019 A | * | 5/1994 | Karlsson | 242/279 |
| 5,362,010 A | * | 11/1994 | Takamatsu | 242/261 |
| 6,857,587 B2 | * | 2/2005 | Chin | 242/279 |
| 6,942,171 B1 | * | 9/2005 | Chang | 242/261 |
| 7,007,881 B2 | * | 3/2006 | Chang | 242/257 |
| 7,500,631 B2 | * | 3/2009 | Kitajima | 242/279 |

FOREIGN PATENT DOCUMENTS

| | | | | |
|---|---|---|---|---|
| JP | 06201020 A | * | 7/1994 | 403/1 |
| JP | 7-327560 A | | 12/1995 | |
| JP | 11-346614 A | | 12/1999 | |
| JP | 3455629 B2 | | 10/2003 | |

* cited by examiner

FISHING REEL GEAR ATTACHMENT STRUCTURE

CROSS-REFERENCE TO RELATED APPLICATIONS

This application claims priority to Japanese Patent Application No. 2010-257909 filed on Nov. 18, 2010. The entirety disclosure of Japanese Patent Application No. 2010-257909 is hereby incorporated by reference.

BACKGROUND OF THE INVENTION

1. Field of the Invention

The present invention relates to a gear attachment structure, particularly to a gear attachment structure used for a reciprocating mechanism of a fishing reel, which is configured to receive rotation of a handle transmitted thereto.

2. Background Art

The fishing reels are normally provided with a reciprocating mechanism for uniformly winding a fishing line onto a spool in conjunction with rotation of a handle. The reciprocating mechanism includes a gear component and a traverse cam shaft. The gear component receives rotation of the handle transmitted thereto. The traverse cam shaft is configured to be rotated by the gear component. In the spinning reels, for instance, an oscillating mechanism functioning as a reciprocating mechanism normally includes a driven gear (an example of a gear component) and a traverse cam shaft. The driven gear is meshed with a pinion gear while being coupled to the traverse cam shaft in a unitarily rotatable state. For example, the reciprocating mechanism structure is described in the specification of Japan Patent No. 3455629. In the dual-bearing reels, on the other hand, a level winding mechanism functioning as a reciprocating mechanism normally includes a driven gear and a traverse cam shaft. The driven gear is meshed with a main gear while being coupled to the traverse cam shaft in a unitarily rotatable state.

SUMMARY

The well-known driven gear is made of, metal for example. The driven gear is attached to a gear support portion of the traverse cam shaft in a unitarily rotatable state. Specifically, the gear portion is formed on the axial end of the traverse cam shaft and includes a non-circular gear engaging portion. The gear engaging portion is obtained by forming a pair of parallel surfaces on the outer peripheral surface of the gear support portion by machining. Therefore, the gear engaging portion includes a pair of parallel straight portions in a cross-sectional view. The driven gear includes a coupling portion with an elongated hole. The elongated hole includes a pair of parallel straight portions to be engaged with the straight portions of the gear engaging portion. Accordingly, the driven gear is unitarily rotatable with the traverse cam shaft. It should be noted that the elongated hole is pierced by stamping.

In the well-known structure, the gear component is coupled to the traverse cam shaft in a unitarily rotatable state while the straight portions of the gear engaging portion are engaged with the straight portions of the elongated hole of the coupling portion. However, shear droops are produced in the straight portions of the elongated hole when the elongated hole is pierced by stamping. A clearance is produced between the straight portions of the gear engaging portion formed by machining and the elongated hole formed by stamping. This produces wobble between the gear component and the traverse cam shaft in a rotational direction. When wobble is produced in a rotational direction, anglers feel that the handle is not smoothly rotated.

In view of the above, the present invention addresses a need to inhibit wobble between the gear component and the traverse cam shaft in a rotational direction by simple machining.

Further, the outer diameter of the gear engaging portion is the same as that of the gear support portion in the well-known structure. In other words, the length of each straight portion of the gear engaging portion is less than the outer diameter of the gear engaging portion. Therefore, the contact length between the straight portions of the gear engaging portion and the elongated hole is less than the outer diameter of the gear support portion. Accordingly, wobble is easily produced between the gear component and the traverse cam shaft in a rotational direction even when a slight clearance is produced between the gear component and the straight portions of the gear engaging portion.

In view of the above, the present invention further addresses a need to inhibit wobble between the gear component and the traverse cam shaft in a rotational direction even when a clearance is produced between the gear component and the straight portions.

A fishing reel gear attachment structure is for a fishing reel reciprocating mechanism. The fishing reel gear attachment structure configured to receive rotation of a handle. The fishing reel gear attachment structure including a traverse cam shaft and a metal gear component. The traverse cam shaft includes a shaft body, a gear support portion, and a gear engaging portion. The shaft body includes intersecting helical grooves on an outer peripheral surface thereof and includes a longitudinal end. The gear support portion includes a circular cross-section, and is configured on the longitudinal end. The gear engaging portion including a non-circular cross-section, and first and second opposed portions and first and second straight portions on a surface thereof. The first opposed portion is configured opposite to the second opposed portion across a cross-sectional center of the gear engaging portion. The first opposed portion is attached to and being next to the first and second straight portions. The metal gear component including a gear portion, an axis aligned portion, and a coupling portion. The gear portion is configured on an outer peripheral surface of the gear component. The gear portion is configured to receive rotation of the handle. The axis aligned portion is configured on an inner peripheral surface of the gear component, and is fitted to the gear support portion. An axis of the gear component is aligned with an axis of the traverse cam shaft. The coupling portion is coupled to the gear engaging portion in a unitarily rotatable state. The coupling portion includes a slot configured on first end surface of the gear component, where the slot is engaged with the first and second straight portions.

BRIEF DESCRIPTION OF THE DRAWINGS

Referring now to the attached drawings which form a part of this original disclosure.

DETAILED DESCRIPTION OF THE EXEMPLARY EMBODIMENTS

First Exemplary Embodiment

Entire Structure

Figure 1:
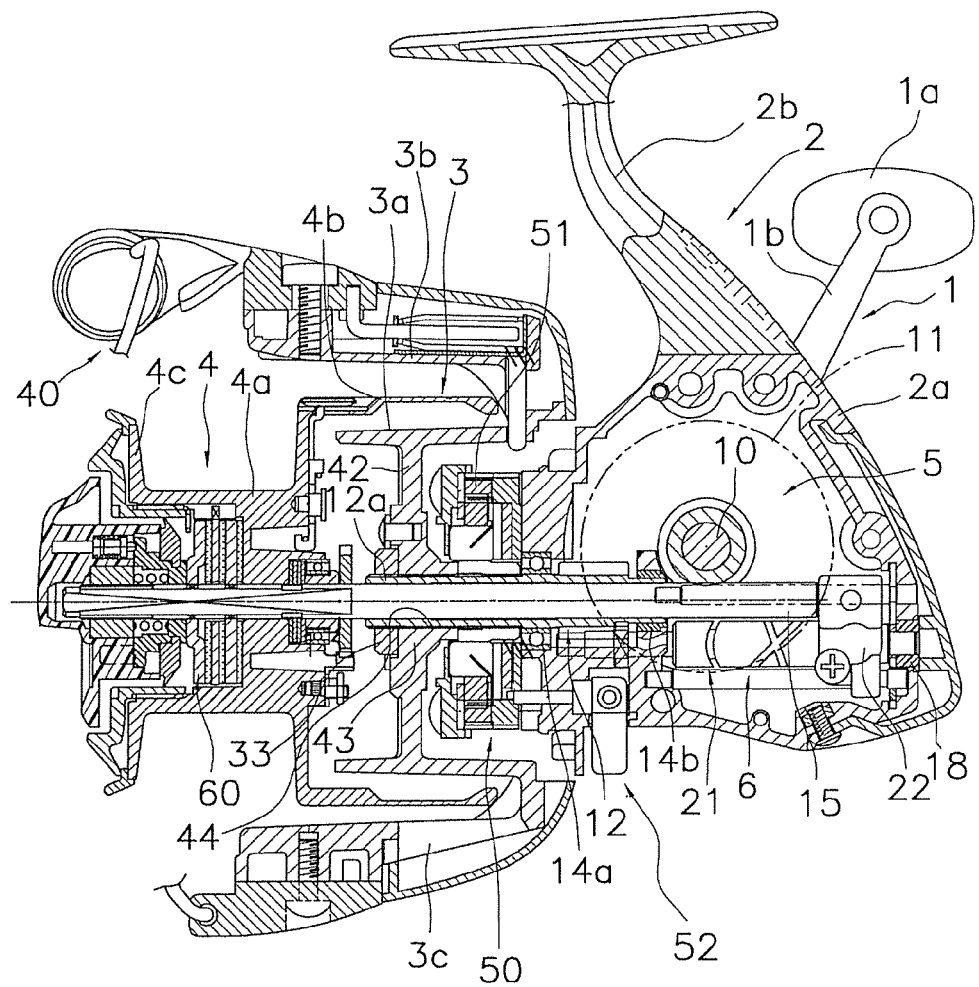
FIG. 1 is a cross-sectional side view of a spinning reel adopting a first exemplary embodiment of the present invention.

As illustrated in FIG. 1, a spinning reel of an exemplary embodiment of the present invention includes a handle assembly 1, a reel unit 2, a rotor 3, and a spool 4. The handle assembly 1 is rotatably supported by the reel unit 2. The rotor 3 is rotatably supported at the front of the reel unit 2. The spool 4 is configured to wind a fishing line onto the outer peripheral surface thereof. The spool 4 is disposed at the front of the rotor 3 while being movable back and forth.

Figure 2:
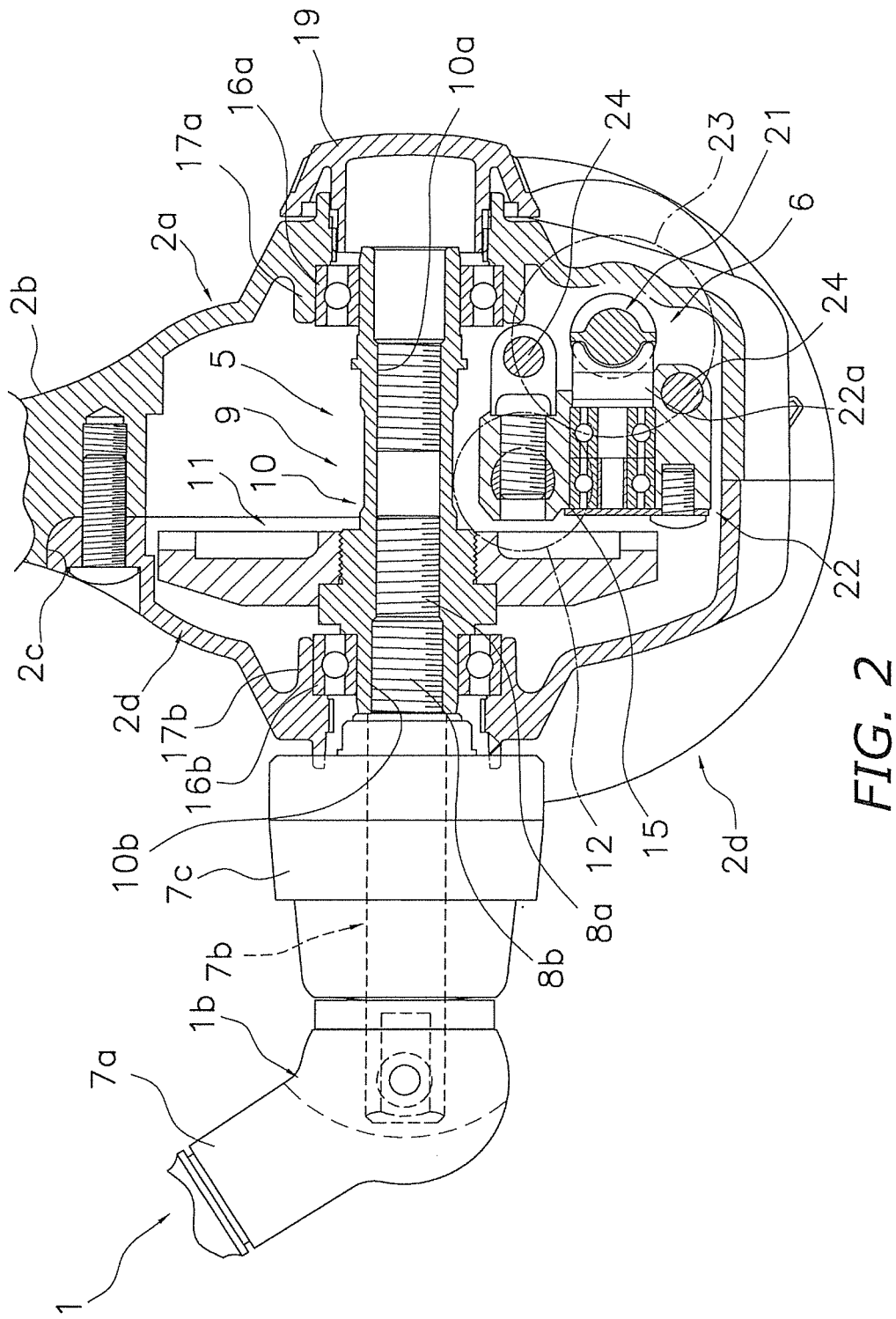
FIG. 2 is a cross-sectional rear view of the spinning reel.

As illustrated in FIGS. 1 and 2, the handle assembly 1 is a member screwed onto a drive gear shaft 10 to be described. The handle assembly 1 includes a T-shaped knob 1a and an L-shaped crank arm 1b that the knob 1a is rotatably attached to the distal end thereof. The crank arm 1b includes an arm portion 7a, a shaft portion 7b, and a tubular member 7c. The base end of the arm portion 7a is pivotably attached to the shaft portion 7b. The tubular member 7c is disposed for screwing the shaft portion 7b into the drive gear shaft 10. The shaft portion 7b is a member having a rod-shaped cross-section. The shaft portion 7b includes a first male threaded portion 8a and a second male threaded portion 8b on one of the distal ends thereof (i.e., the right end in FIG. 2). Specifically, the first and second male threaded portions 8a and 8b are axially aligned while being concentric to each other. The first male threaded portion 8a is a right handed screw (i.e., a screw configured to be tightened when rotated in a clockwise direction). In contrast, the second male threaded portion 8b is a left handed screw (i.e., a screw configured to be tightened when rotated in a counterclockwise direction) and has a diameter greater than that of the first male threaded portion 8a. Accordingly, the handle assembly 1 is allowed to be attached to either the right side of the reel unit 2 (see FIG. 1) or the left side of the reel unit 2 (see FIG. 2).

The reel unit 2 includes a reel body 2a and a fishing rod attachment leg 2b. The reel body 2a includes an opening 2c in a lateral part thereof. The fishing rod attachment leg 2b is a T-shaped portion integrally formed with the reel body 2a. Specifically, the fishing rod attachment leg 2b is forwardly extended from the reel body 2a in an obliquely upward direction. The opening 2c is covered with a lid member 2d.

The reel body 2a includes a mechanism attachment space in the inside thereof. The mechanism attachment space continuers to the opening 2c. A rotor drive mechanism 5 and an oscillating mechanism 6 (an example of a fishing reel reciprocating mechanism) are disposed in the mechanism attachment space. The rotor drive mechanism 5 is configured to rotate the rotor 3 in conjunction with rotation of the handle assembly 1. The oscillating mechanism 6 is configured to move the spool 4 back and forth for uniformly winding the fishing line.

As illustrated in FIG. 2, the reel body 2a includes a tubular boss 17a on the right surface thereof. The boss 17a is inwardly protruding from the reel body 2a for accommodating a bearing 16a. The bearing 16a supports the right axial end of the drive gear shaft 10. The lid member 2d includes a boss 17b facing the boss 17a. The boss 17b is inwardly protruding from the lid member 2d for accommodating a bearing 16b. The bearing 16b supports the left axial end of the drive gear shaft 10. One boss (e.g., the boss 17a in FIG. 3), disposed on the opposite side of the other boss that the handle assembly 1 is attached, is covered with a cap 19.

As illustrated in FIGS. 1 and 2, the rotor drive mechanism 5 includes a drive gear assembly 9 and a pinion gear 12. The handle assembly 1 is attached to the drive gear assembly 9 in a non-rotatable state. The pinion gear 12 is meshed with the drive gear assembly 9.

As illustrated in FIG. 2, the drive gear assembly 9 includes the drive gear shaft 10 and a drive gear 11. The drive gear 11 is fixed onto the drive gear shaft 10 in a unitarily rotatable state.

The drive gear shaft 10 is a hollow member made of stainless. One axial end of the drive gear shaft 10 is rotatably supported by the reel body 2a through the bearing 16a, whereas the other axial end of the drive gear shaft 10 is rotatably supported by the lid member 2d through the bearing 16b. The bearings 16a and 16b are anticorrosive roller bearings.

The drive gear shaft 10 includes a first female threaded portion 10a and a second female threaded portion 10b in the center part thereof. Specifically, the first and second female threaded portions 10a and 10b are axially separate away from each other while being concentric to each other. The first male threaded portion 8a is screwed into the first female threaded portion 10a, whereas the second male threaded portion 8b is screwed into the second female threaded portion 10b.

As illustrated in FIG. 1, the pinion gear 12 is a tubular member disposed along a back-and-forth direction of the spinning reel. The pinion gear 12 is rotatably attached to the reel body 2a. A tip portion 12a of the pinion gear 12 penetrates through the center part of the rotor 3. In the penetrating position, the tip portion 12a is fixed to the rotor 3 by a nut 33. The axial intermediate part of the pinion gear 12 is supported by the reel body 2a through a first bearing 14a, whereas the axial rear end of the pinion gear 12 is supported by the reel body 2a through a second bearing 14b. Accordingly, the pinion gear 12 is rotatable with respect to the reel body 2a. A spool shaft 15 penetrates through the inner periphery of the pinion gear 12. The pinion gear 12 is meshed with the drive gear 11 while being meshed with the oscillating mechanism 6.

Oscillating Mechanism Structure

As illustrated in FIGS. 1 and 2, the oscillating mechanism 6 includes a traverse cam shaft 21, a slider 22 and a driven gear 23 (an example of a gear component). The traverse cam shaft 21 is disposed roughly immediately below and in parallel to the spool shaft 15. The traverse cam shaft 21 is made of free-machining brass for example. The driven gear 23 is made of aluminum alloy for example. The traverse cam shaft 21 and the driven gear 23 form a fishing reel gear attachment structure 20 according to an exemplary embodiment of the present invention.

Figure 3:
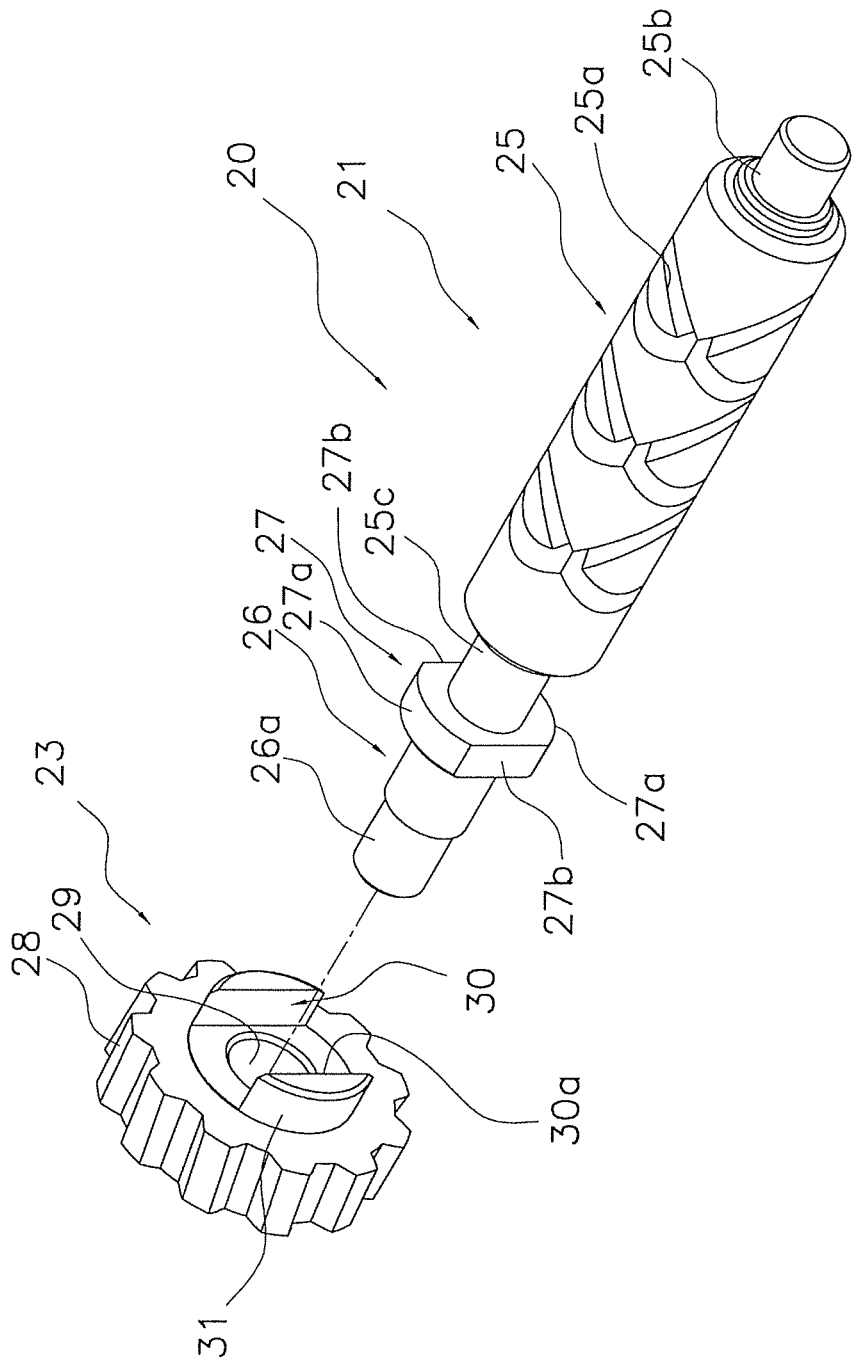
FIG. 3 is an exploded perspective view of a driven gear and a traverse cam shaft of the spinning reel.
Figure 4:
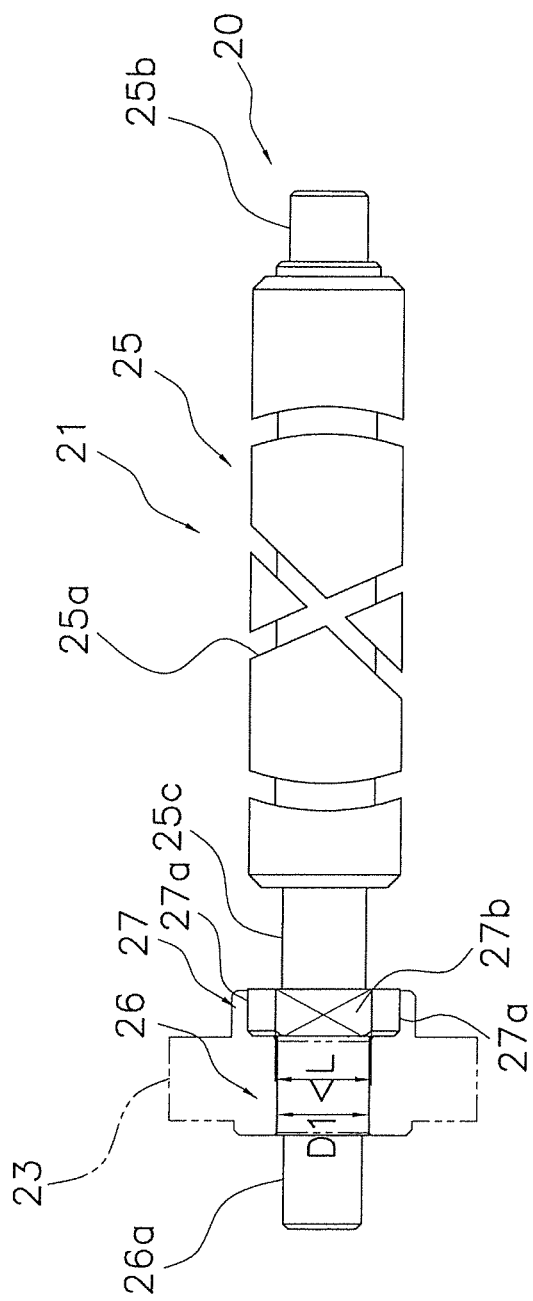
FIG. 4 is a side view of the traverse cam shaft.

As illustrated in FIGS. 3 and 4, the traverse cam shaft 21 includes a shaft body 25, a gear support portion 26, and a gear engaging portion 27. The shaft body 25 includes intersecting helical grooves 25a on the outer peripheral surface thereof. The shaft body 25 is a large-diameter portion of the traverse cam shaft 21. The shaft body 25 includes a first support portion 25b on the rear end thereof (i.e., the right end in FIG. 4). The first support portion 25b is a small-diameter portion rotatably supported by the rear part of the reel body 2a through a bearing 18. The shaft body 25 includes a small-diameter connecting portion 25c on the front end thereof (i.e., the left end in FIG. 4).

The gear support portion 26 has a circular cross-section. The gear support portion 26 is disposed on the front end side of the shaft body 25 through the gear engaging portion 27. The gear support portion 26 has a diameter less than that of the gear engaging portion 27. The gear support portion 26 includes a second support portion 26a on the front end thereof. The second support portion 26a is a small-diameter portion rotatably supported by the front part of the reel body 2a through a bearing (not illustrated in the figures).

The gear engaging portion 27 is disposed for allowing the driven gear 23 to be unitarily rotated with the traverse cam shaft 21. The gear engaging portion 27 has a non-circular cross-section having a diameter roughly the same as that of the shaft body 25. The gear engaging portion 27 includes a pair of opposed circular-arc portions 27a as an opposed portions and a pair of straight portions 27b. One of the straight portions 27b is coupled to one ends of the circular-arc portions 27a, whereas the other of the straight portions 27b is coupled to the other ends of the circular-arc portions 27a. The diameter formed by the opposed circular-arc portions 27a is roughly the same as that of the shaft body 25. The circular-arc portions 27a are formed concentric to the axis of the traverse cam shaft 21. The straight portions 27b are formed by cutting the edges of the circular outer peripheral surface of the gear engaging portion 27 in parallel to the diameter of the gear engaging portion 27. The straight portions 27b are disposed radial outwards of the gear support portion 26. In the first exemplary embodiment, the circular-arc portions 27a of the gear engaging portion 27 are configured opposite to each other while being disposed radial outwards of the gear support portion 26. Likewise, the straight portions 27b of the gear engaging portion 27 are configured opposite to each other while being disposed radial outwards of the gear support portion 26. In other words, a length L (i.e., width) of each straight portion 27b is greater than an outer diameter D1 of the gear support portion 26 (D1<L) as illustrated in FIG. 4.

As illustrated in FIGS. 1 and 2, the slider 22 is configured to reciprocate back and forth in conjunction with rotation of the traverse cam shaft 21. The slider 22 is movably supported by two guide shafts 24 (see FIG. 2) disposed in parallel to the traverse cam shaft 21. An engaging member 22a is attached to the inside of the slider 22. The engaging member 22a is engaged with the intersecting helical grooves 25a formed on the outer peripheral surface of the traverse cam shaft 21. The rear end of the spool shaft 15 is fixed to the slider 22 in a non-rotatable state.

Figure 5:
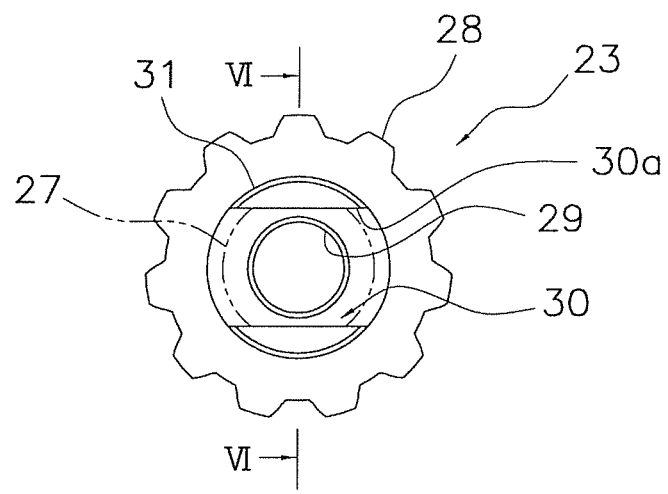
FIG. 5 is a rear view of the driven gear.
Figure 6:
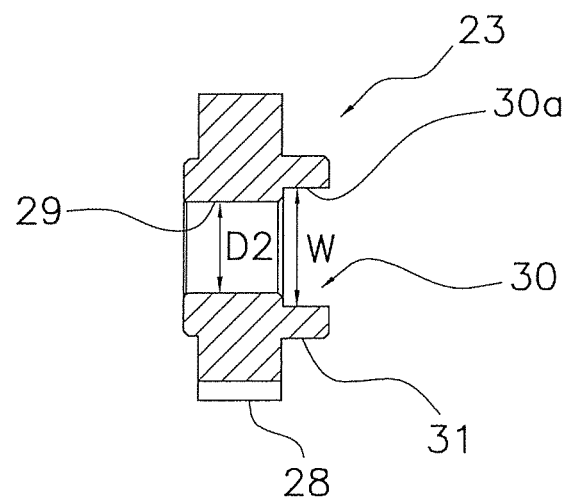
FIG. 6 is a cross-sectional view of the driven gear illustrated in FIG. 5 sectioned along a line VI-VI.

As illustrated in FIGS. 3, 5 and 6, the driven gear 23 includes a gear portion 28 to be meshed with the pinion gear 12, an axis aligned portion 29, and a coupling portion 30. The driven gear 23 is engaged with the gear engaging portion 27 of the traverse cam shaft 21 in a unitarily rotatable state. The gear portion 28 is formed by helical teeth formed on the outer peripheral surface of the driven gear 23. The gear portion 28 is meshed with the pinion gear 12. The axis aligned portion 29 is formed on the inner peripheral surface of the driven gear 23. The axis aligned portion 29 is fitted to the gear support portion 26 for aligning the axis of the driven gear 23 with respect to the traverse cam shaft 21. The coupling portion 30 includes a slot 30a formed in a boss 31 backwardly protruding from the rear surface (an example of an end surface) of the driven gear 23. The slot 30a is slightly extended to the protruding end of the boss 31 from the base end of the boss 31. Further, the slot 30a is formed across the diameter of the boss 31. As illustrated in FIG. 6, a width W of the slot 30a is greater than an inner diameter D2 of the axis aligned portion 29. The slot 30a is highly accurately formed by simple machining using such as a T-slot tool or a milling tool.

As illustrated in FIG. 1, the rotor 3 includes a cylindrical portion 3a, a first rotor arm 3b, a second rotor arm 3c, and a bail arm 40. The cylindrical portion 3a is fixed to the pinion gear 12. The first and second rotor arms 3b and 3c are disposed on the lateral sides of the cylindrical portion 3a while being opposite to each other across a cross-sectional center of the cylindrical portion 3a. The bail arm 40 is configured to guide the fishing line to the spool 4. The cylindrical portion 3a, the first rotor arm 3b and the second rotor arm 3c are made of aluminum alloy and are integrally formed. As described above, the center part of the tip of the cylindrical portion 3a is fixed to the tip portion 12a of the pinion gear 12 by the nut 33 in a unitarily rotatable state. The bail arm 40 serves to wind the fishing line onto the spool 4. The bail arm 40 is attached to the tips of the first and second rotor arms 3b and 3c while being pivotable between a fishing-line winding position and a fishing-line releasing position.

The cylindrical portion 3a includes a front wall 42 in the front part thereof. The front wall 42 includes a boss 43 in the center part thereof. The boss 43 includes a through hole 44 in the center part thereof. The through hole 44 is engaged with the pinion gear 12 for allowing the rotor 3 to unitarily rotate with the pinion gear 12. The tip portion 12a of the pinion gear 12 and the spool shaft 15 penetrate through the through hole 44.

An anti-rotation mechanism 50 is disposed within the cylindrical portion 3a while being disposed adjacent to the boss 43. The anti-rotation mechanism 50 includes a roller-type one-way clutch 51 and a switching mechanism 52. In the one-way clutch 51, an inner race is allowed to freely rotate while being attached to the pinion gear 12 in a non-rotatable state. The switching mechanism 52 is configured to switch the one-way clutch 51 between an activation state (i.e., a reverse rotation prevention state) and a deactivation state (i.e., a reverse rotation permission state).

As illustrated in FIG. 1, the spool 4 is disposed between the first and second rotor arms 3b and 3c of the rotor 3. The center part of the spool 4 is coupled to the distal end of the spool shaft 15 through a drag mechanism 60. The spool 4 includes a bobbin trunk 4a, a skirt 4b, and a front flange 4c. The bobbin trunk 4a allows the fishing line to be wound about the outer periphery thereof. The skirt 4b is integrally formed with the bobbin trunk 4a while being extended from the rear end of the bobbin trunk 4a. The front flange 4c is disposed on the front end of the bobbin trunk 4a. The bobbin trunk 4a is a cylindrical member and the outer peripheral surface thereof is disposed in parallel to the spool shaft 15.

Operation and Actions of Reel

The bail arm 40 is flipped to the fishing-line releasing position in casting. The fishing rod is herein cast while the fishing line is hooked by the index finger of the angler's hand grabbing the fishing rod. Accordingly, the fishing line is released forward at a high momentum due to the weight of a terminal tackle. When the handle assembly 1 is rotated in the fishing-line winding direction under the condition, the rotor drive mechanism 5 rotates the rotor 3 in the fishing-line winding direction. Further, the oscillating mechanism 6 reciprocates the spool 4 back and forth, and a bail flip mechanism (not illustrated in the figures) returns the bail arm 44 to the fishing-line winding position. The fishing line is accordingly wound about the spool 4.

In the oscillating mechanism 6, the driven gear 23 includes the coupling portion 30 having the slot 30a to be engaged with the gear engaging portion 27 of the traverse cam shaft 21. The slot 30a is herein formed by machining. The slot 30a is accurately engaged with the gear engaging portion 27. Therefore, it is possible to inhibit wobble between the traverse cam shaft 21 and the driven gear 23 in the rotational direction by simple machining.

First Modification of First Exemplary Embodiment

Figure 7:
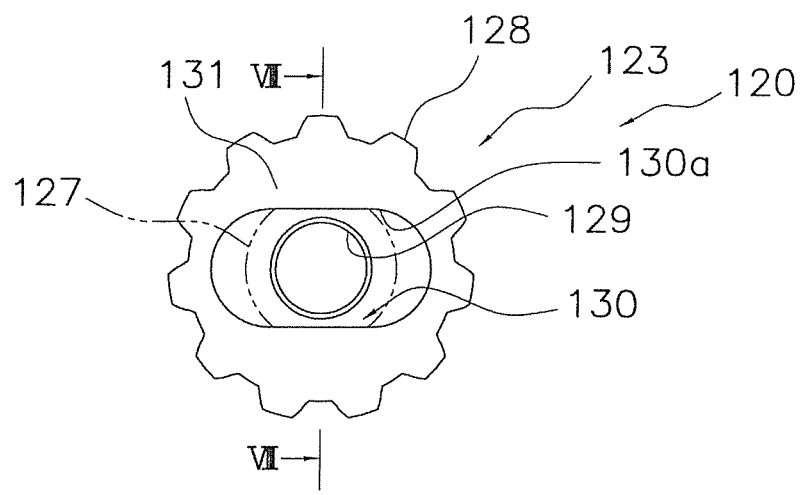
FIG. 7 is a diagram corresponding to FIG. 5, illustrating a rear view of a driven gear according to a first modification of the first exemplary embodiment.

In the first exemplary embodiment, the coupling portion 30a includes the slot 30a on the boss 31 protruding rearwards, and the slot 30a is formed across the diameter of the boss 31. In contrast, a gear attachment structure 120 of a first modification of the first exemplary embodiment includes a driven gear 123 as illustrated in FIG. 7. The driven gear 123 includes a slot 130a without including the boss 31 formed in the driven gear 23 of the first exemplary embodiment in order to attach the driven gear 123 onto the traverse cam shaft 21 structured identical to that of the first exemplary embodiment.

Figure 8:
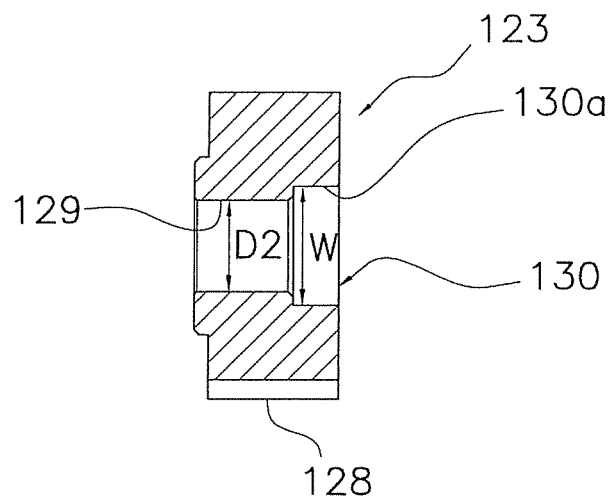
FIG. 8 is a diagram corresponding to FIG. 6, illustrating a cross-sectional view of the driven gear illustrated in FIG. 7 sectioned along a line VIII-VIII.

As illustrated in FIGS. 7 and 8, the driven gear 123 of the first modification includes a coupling portion 130 recessed on the rear end surface thereof. The coupling portion 130 includes the slot 130a recessed in an oval shape. The longitudinal ends of the oval slot 130a are not extended to the radial edges of the rear surface of the driven gear 123. Each longitudinal end of the oval slot 130a has a circular-arc shape with a diameter equal to a width W of the slot 130a. Therefore, the slot 130a can be easily formed with an endmill having a diameter equal to the width W of the slot 130a.

The driven gear 123 thus structured is allowed to be attached onto the traverse cam shaft 21 structured identical to that of the first exemplary embodiment. The width W of the slot 130a is identical to that of the first exemplary embodiment. Likewise, a diameter D2 of an axis aligned portion 129 is identical to that of the first exemplary embodiment. The slot 130a is herein formed on the rear end surface of the driven gear 123 without being extended to the radial edges of the rear end surface. Therefore, troubles such as destruction of gear teeth can be inhibited in machining the driven gear for forming the slot even when the boss is not formed on the driven gear.

Second Modification of First Exemplary Embodiment

In the first exemplary embodiment, the diameter D2 of the axis aligned portion 29 is less than the width W of the slot 30a.

Figure 10:
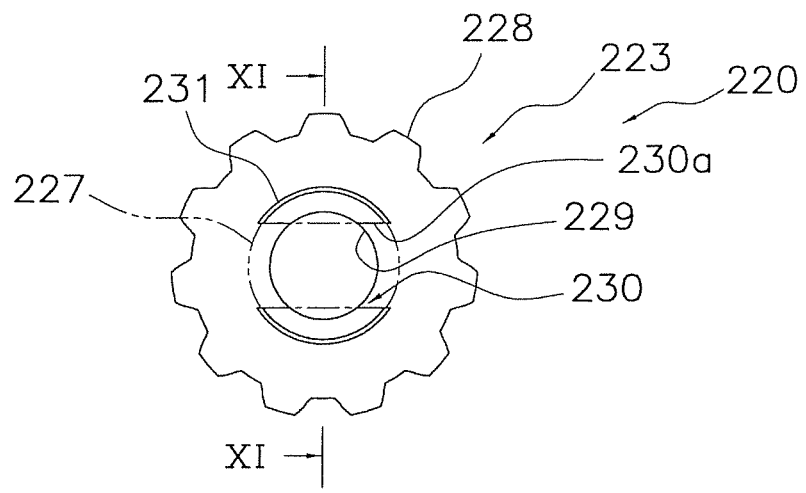
FIG. 10 is a diagram corresponding to FIG. 5, illustrating a rear view of a driven gear according to the second modification of the first exemplary embodiment.
Figure 11:
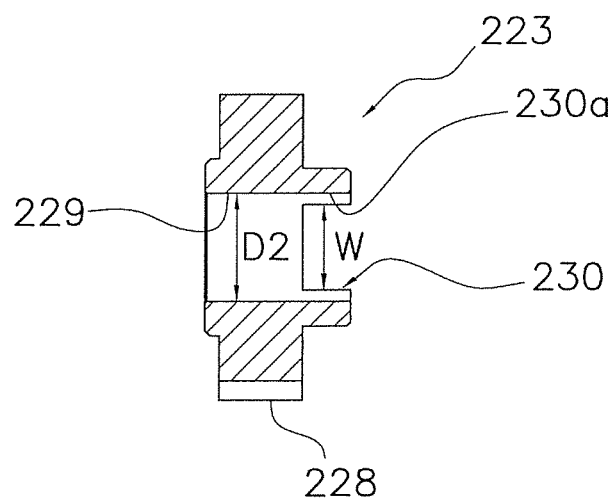
FIG. 11 is a diagram corresponding to FIG. 6, illustrating a cross-sectional view of the driven gear illustrated in FIG. 10 sectioned along a line XI-XI.

Similarly in the first modification of the first exemplary embodiment, the diameter D2 of the axis aligned portion 129 is less than the width W of the slot 130a. In a gear attachment structure 220 of a second modification of the first exemplary embodiment, in contrast, a width W of a slot 230a is less than a diameter D2 of an axis aligned portion 229 as illustrated in FIGS. 10 and 11. Therefore, the longitudinal intermediate part of the slot 230a is recessed in a circular-arc shape for continuing to the inner peripheral surface of the axis aligned portion 229.

Figure 9:
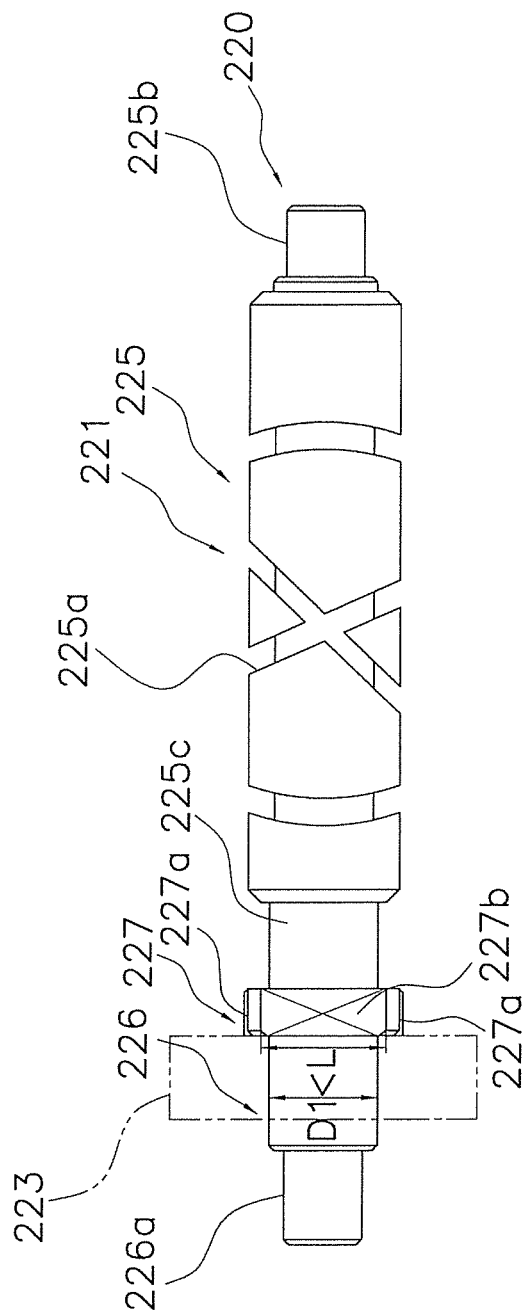
FIG. 9 is a diagram corresponding to FIG. 4, illustrating a side view of a traverse cam shaft according to a second modification of the first exemplary embodiment.

Further in a traverse cam shaft 221 illustrated in FIG. 9, the diameter of a continuing portion 225c is greater than the corresponding diameters of the first exemplary embodiment and the first modification of the first exemplary embodiment. Likewise, the diameter of a gear support portion 226 is greater than the corresponding diameters of the first exemplary embodiment and the first modification of the first exemplary embodiment. On the other hand, the interval between a pair of straight portions 227b is less than the corresponding intervals of the first exemplary embodiment and the first modification of the first exemplary embodiment. In other words, the straight portions 227b are recessed with respect to the continuing portion 225c and the gear support portion 226. Therefore, the both ends of the slot 230a excluding the intermediate part thereof are engaged with the straight portions 227b. Accordingly, a driven gear 223 can be supported by the gear support portion 226 and a circular-arc portion 227a of a gear engaging portion 227. Consequently, tilt of the driven gear 223 is inhibited in the back-and-forth direction.

Second Exemplary Embodiment

Figure 12:
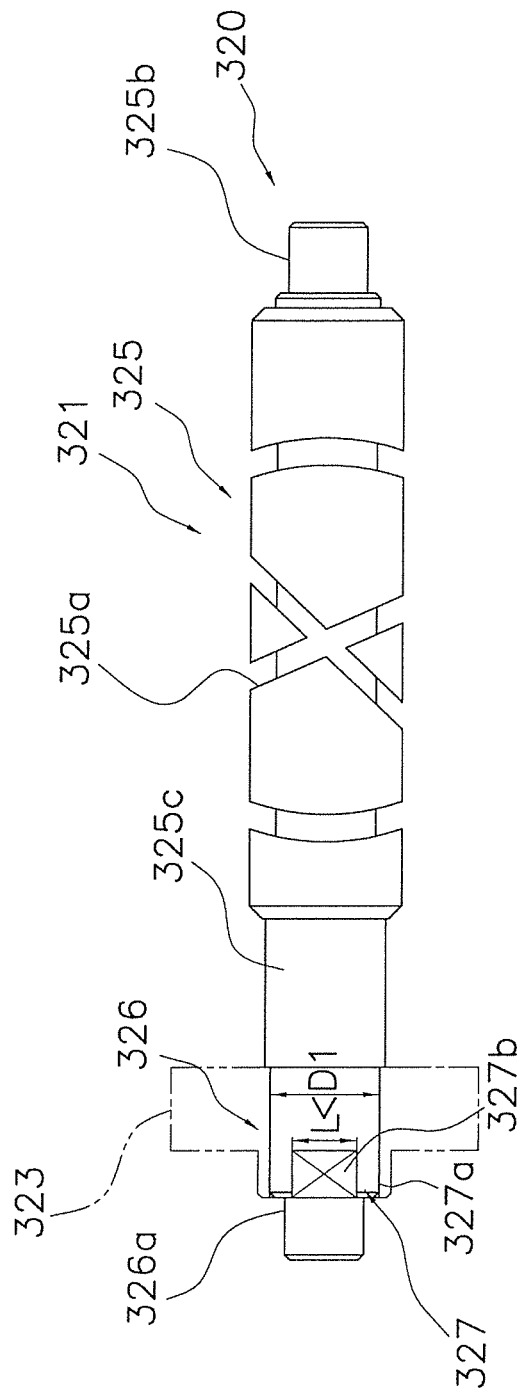
FIG. 12 is a diagram corresponding to FIG. 4, illustrating a side view of a traverse cam shaft according to a second exemplary embodiment of the present invention.

In the first exemplary embodiment, the diameter of the gear engaging portion 27 (i.e., the diameter between the circular-arc portions 27a) of the traverse cam shaft 21 is greater than that of the gear support portion 26. In a gear attachment structure 320 of a second exemplary embodiment, in contrast, the diameter of a gear engaging portion 327 (i.e., the diameter between circular-arc portions 327a) of a traverse cam shaft 321 is the same as a diameter D1 of a gear support portion 326 as illustrated in FIG. 12. Therefore, a length L of each straight portion 327b of the gear engaging portion 327 is less than the diameter D1 of the gear support portion 326.

Figure 13:
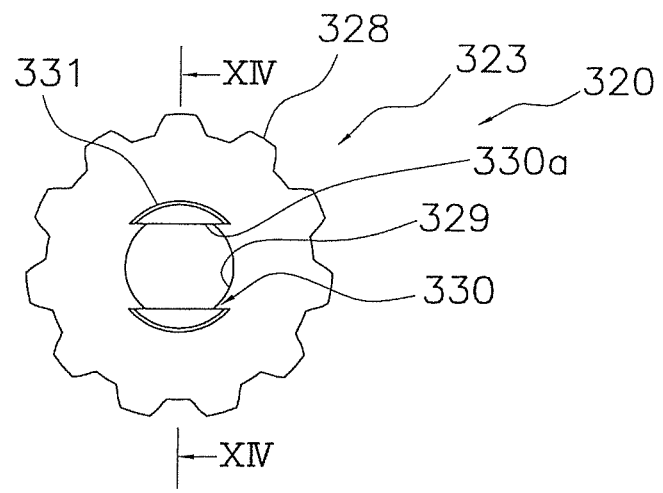
FIG. 13 is a diagram corresponding to FIG. 5, illustrating a rear view of a driven gear according to the second exemplary embodiment of the present invention.
Figure 14:
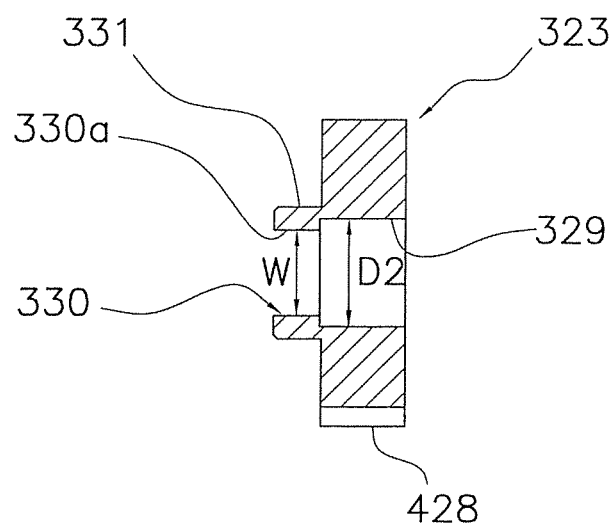
FIG. 14 is a diagram corresponding to FIG. 6, illustrating a cross-sectional view of the driven gear illustrated in FIG. 13 sectioned along a line XIV-XIV.

Further as illustrated in FIGS. 13 and 14, a driven gear 323 includes a boss 331 forwardly protruding from the front end surface thereof (an example of a first end surface). A coupling portion 330 includes a slot 330a in the boss 311. The slot 330a has a width W less than a diameter D2 of an axis aligned portion 329. The axis aligned portion 329 is not entirely formed through the driven gear 323 in the longitudinal direction. Specifically, the axis aligned portion 329 is slightly formed from the base end of the boss 331 towards the tip of the boss 331 although it is formed through the main body of the driven gear 323 in the longitudinal direction.

According to the above-structured gear attachment structure 320 of the second exemplary embodiment, the slot 330a can be formed by machining. Therefore, wobble can be inhibited between the driven gear 323 and the traverse cam shaft 321 in the rotational direction. Further, the diameter of the traverse cam shaft 321 is gradually reduced from a shaft body 325 towards the both ends thereof. Therefore, the traverse cam shaft 321 can be easily processed by machining.

Features

The aforementioned exemplary embodiments and modifications can be expressed as follows. It should be noted in the following features (A) to (G) that reference numerals are assigned to components when the components are described for the first time in the respective features.

(A) The gear attachment structure (20, 120, 220 or 320) for the spinning reel is used for the oscillating mechanism (6) for the spinning reel, and rotation of the handle assembly (1) is configured to be transmitted to the gear attachment structure. The gear attachment structure includes the traverse cam shaft (21, 221 or 321) and the driven gear (23, 223 or 323) as an exemplary gear component. The traverse cam shaft includes the shaft body (25, 225 or 325), the gear support portion (26, 226 or 326) and the gear engaging portion (27, 227 or 327). The gear support portion includes the intersecting helical grooves (25*a*, 225*a* or 325*a*) on the outer peripheral surface thereof. The gear support portion is disposed on one of the axial ends of the shaft body and has a circular cross-section. The gear engaging portion includes a pair of the circular-arc portions (27*a*, 227*a* or 327*a*) as the opposed portions and a pair of the straight portions (27*b*, 227*b* or 327*b*). The circular-arc portions are either disposed along and within the outer periphery of the gear support portion or disposed radial outwards of the gear support portion. One of the straight portions is connected to one ends of the circular-arc portions, whereas the other of the straight portions is connected to the other ends of the circular-arc portions.

The driven gear is made of metal and includes the gear portion (28, 128, 228 or 328), the axis aligned portion (29, 129, 229 or 329) and the coupling portion (30, 130, 230 or 330). The gear portion is formed on the outer peripheral surface of the driven gear, and rotation of the handle assembly is transmitted to the gear portion. The axis aligned portion is formed on the inner peripheral surface of the driven gear. The axis aligned portion is fitted to the gear support portion for aligning the axis of the driven gear with respect to the traverse cam shaft. The coupling portion includes the slot (30*a*, 130*a*, 230*a* or 330*a*) formed on one of the axial ends of the driven gear. The slot is engaged with the straight portions. Accordingly, the coupling portion is coupled to the gear engaging portion in a unitarily rotatable state.

According to the gear attachment structure, the axis aligned portion of the driven gear is fitted to the gear support portion of the traverse cam shaft for aligning the axis of the driven gear with respect to the traverse cam shaft. Further, the slot of the coupling portion is engaged with a pair of the straight portions of the gear engaging portion of the traverse cam shaft for allowing the driven gear and the traverse cam shaft to unitarily rotate. The coupling portion to be engaged with the straight portions of the gear engaging portion is herein formed as a slot not as an elongated hole. Therefore, the coupling portion can be easily formed by machining. This can reduce a clearance between the slot and the straight portions as much as possible. Wobble can be consequently inhibited between the driven gear and the traverse cam shaft in the rotational direction by simple machining.

(B) In the gear attachment structure (20, 120 or 220), the gear engaging portion (27 or 227) is disposed between the gear support portion (26 or 226) and the shaft body (25 or 225), whereas the slot (30*a*, 130*a* or 230*a*) is formed on the rear end surface of the driven gear (23, 123 or 223) disposed closer to the shaft body. In this case, the gear engaging portion is disposed closer to the shaft body than the gear support portion is. Therefore, the driven gear can be attached onto the traverse cam shaft (21, 121 or 221) from the gear support portion side. Further, the length of each straight portion (27*b* or 227*b*) of the gear engaging portion can be formed greater than the diameter of the gear support portion. With the structure, wobble can be inhibited between the driven gear and the traverse cam shaft in the rotational direction even when a clearance is produced between the slot of the driven gear and the straight portions of the gear engaging portion of the traverse cam shaft.

(C) In the gear attachment structure (20, 120 or 220), the length L of each straight portion (27*b* or 227*b*) is greater than the diameter D1 of the gear support portion (26 or 226). Accordingly, tilt of the driven gear (23, 123 or 223) is inhibited with respect to the traverse cam shaft (21 or 221) in the rotational direction. Therefore, wobble can be further inhibited between the driven gear and the traverse cam shaft in the rotational direction even when a clearance is produced between the slot (30*a*, 130*a* or 230*a*) of the driven gear and the straight portions of the gear engaging portion (27 or 227) of the traverse cam shaft.

(D) In the gear attachment structure (320), the gear support portion (326) is disposed between the gear engaging portion (327) and the shaft body (325), whereas the slot (330*a*) is formed on the front end surface of the driven gear (323) disposed away from the shaft body. In this case, the gear engaging portion has the same size as the gear support portion. However, the slot is engaged with the straight portions of the gear engaging portion. A clearance can be reduced between the slot and the straight portions as much as possible. Wobble can be consequently inhibited between the driven gear and the traverse cam shaft in the rotational direction by simple machining.

(E) In the gear attachment structure (20 or 120), the width W of the slot (30*a* or 130*a*) is greater than the inner diameter D2 of the axis aligned portion (29 or 129). With the structure, the slot and the axis aligned portion are prevented from interfering with each other. This makes it easier to process these components by machining.

(F) In the gear attachment structure (20, 220 or 320), the driven gear (23, 223 or 323) is protruding from the rear end surface (or the front end surface) of the gear portion (28, 228 or 328). The driven gear further includes the boss including the rear end surface (or the front end surface). The slot (30*a*, 230*a* or 330*a*) is formed in the rear end surface (or the front end surface) of the boss. In this case, the slot is formed in the protruding boss. The gear portion of the driven gear is not negatively affected even when the slot is formed by machining.

(G) In the gear attachment structure (20, 120, 220 or 320), the outer diameter between a pair of the circular-arc portions (27*a*, 127*a*, 227*a* or 327*a*) is equal to or greater than that of the gear support portion (26, 226 or 326). In this case, the opposed portions are formed by the circular-arc portions having an outer diameter greater than or equal to that of the gear support portion. Therefore, the opposed portions and the straight portions can be easily formed.

Other Exemplary Embodiments

Exemplary embodiments and modifications of the present invention have been described above. However, the present invention is not limited to the aforementioned exemplary embodiments and modifications. A variety of changes can be herein made without departing from the scope of the present invention.

(a) In the aforementioned exemplary embodiments and modifications, the oscillating mechanism for the spinning reel has been exemplified as a fishing reel reciprocating mechanism. However, an application target component of the present invention is not limited to the above. For example, the present invention can be applied to the level winding mechanisms for the dual-bearing reels and the oscillating mechanisms for the spin-casting reels.

(b) In the aforementioned exemplary embodiments and modifications, the driven gear is directly meshed with the pinion gear. However, the present invention can be applied to a structure that the driven gear is indirectly meshed with the pinion gear through a reduction mechanism.

(c) In the aforementioned exemplary embodiments and modifications, the circular-arc portions, disposed concentric to the axis of the traverse cam shaft 21, are exemplified as the opposed portions. In the present invention, however, the opposed portions are not limited to the above. For example, the opposed portions can be straight portions. Alternatively, the opposed portions can be circular-arc portions disposed about an axis different from the axis of the traverse cam shaft. For example, the opposed portion can be circular-arc portions having a diameter identical to the interval between a pair of straight portions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel gear attachment structure comprising:
   a traverse cam shaft including
      a shaft body including intersecting helical grooves on an outer peripheral surface thereof, the shaft body including a longitudinal end,
      a gear support portion including a circular cross-section and a second support portion on a front end thereof, the gear support portion being configured on the longitudinal end, the second support portion having a diameter smaller than a remainder of the gear support portion and being configured to be rotatably supported by a bearing at a front part of a reel body, and
      a gear engaging portion including a non-circular cross-section, the gear engaging portion including first and second opposed portions and first and second straight portions on a surface thereof, the first opposed portion configured opposite to the second opposed portion across a cross-sectional center of the gear engaging portion, the first opposed portion being attached to the first and second straight portions; and
   a metal gear component including
      a gear portion configured on an outer peripheral surface of the gear component, the gear portion configured to receive rotation of the handle,
      an axis aligned portion configured on an inner peripheral surface of the gear component, the axis aligned portion being fitted to the gear support portion, an axis of the gear component being aligned with an axis of the traverse cam shaft, and
      a coupling portion coupled to the gear engaging portion in a unitarily rotatable state, the coupling portion including a boss and a slot, the boss protruding from a first end surface and the slot being configured on the first end surface of the gear component and extending across a diameter of the boss, the slot including third and fourth straight portions facing the axis of the gear component, the third and fourth straight portions extending substantially parallel to the axis of the gear component, and respectively abutting with the first and second straight portions,
   the gear portion extending until the first end surface,
   the circular cross-section of the gear support portion being disposed adjacent the inner peripheral surface of the gear component, and
   the fishing reel gear attachment structure being configured to reciprocate a spool, being configured to receive rotation of a handle and being configured for a fishing reel reciprocating mechanism.

2. The fishing reel gear attachment structure according to claim 1, wherein
   the gear engaging portion is configured between the gear support portion and the shaft body, and
   the first end surface including the slot is disposed closer to the shaft body than a second end surface is, where the second end surface is opposite to the first end surface.

3. The fishing reel gear attachment structure according to claim 2, wherein
   each of the first and second straight portions has a length greater than a diameter of the gear support portion.

4. The fishing reel gear attachment structure according to claim 2, wherein
   the slot has a length greater than an inner diameter of the axis aligned portion.

5. The fishing reel gear attachment structure according to claim 1, wherein
   the gear support portion is disposed between the gear engaging portion and the shaft body, and
   the first end surface including the slot is disposed further from the shaft body than a second end surface is, where the second end surface is opposite to the first end surface.

6. The fishing reel gear attachment structure according to claim 1, wherein
   the opposed portions include a pair of circular-arc portions, each of the circular-arc portions having an outer diameter equal to or greater than an outer diameter of the gear support portion.

7. The fishing reel gear attachment structure according to claim 6, wherein
   the pair of circular-arc portions extends in a circumferential direction of the gear support portion, so as to be disposed along an outer periphery of the gear support portion.

8. The fishing reel gear attachment structure according to claim 1, wherein
   the coupling portion has a diameter smaller than a diameter of the gear portion.

9. The fishing reel gear attachment structure according to claim 1, wherein
the third and fourth straight portions of the slot extend substantially perpendicular to the first end surface at a portion thereof abutting with the first and second straight portions.

10. The fishing reel gear attachment structure according to claim 1, wherein
the traverse cam shaft includes a connecting portion disposed between the shaft body and the gear engaging portion, the connecting portion having a diameter that is smaller than a diameter of the shaft body.

\* \* \* \* \*